US010599150B2

(12) United States Patent
Graham et al.

(10) Patent No.: US 10,599,150 B2
(45) Date of Patent: Mar. 24, 2020

(54) AUTONOMOUS VEHICLE: OBJECT-LEVEL FUSION

(71) Applicants: The Charles Stark Draper Laboratory, Inc., Cambridge, MA (US); Veoneer US Inc., Southfield, MI (US)

(72) Inventors: Matthew Graham, Arlington, MA (US); Troy Jones, Somerville, MA (US); Kyra Horne, Boston, MA (US); Scott Lennox, Arlington, MA (US); Jon D. Demerly, Byron, MI (US); Stephen Sheldon Strong, Howell, MI (US); Afrah Faiz Naik, Waltham, MA (US)

(73) Assignees: The Charles Stark Kraper Laboratory, Inc., Cambridge, MA (US); VEONEER US INC., Southfield, MI (US)

( * ) Notice: Subject to any disclaimer, the term of this patent is extended or adjusted under 35 U.S.C. 154(b) by 0 days.

(21) Appl. No.: 15/280,291

(22) Filed: Sep. 29, 2016

(65) Prior Publication Data

US 2018/0089538 A1    Mar. 29, 2018

(51) Int. Cl.
*G06K 9/00* (2006.01)
*G05D 1/02* (2020.01)
(Continued)

(52) U.S. Cl.
CPC ............ *G05D 1/021* (2013.01); *G01S 7/4808* (2013.01); *G01S 13/726* (2013.01); *G01S 13/865* (2013.01);
(Continued)

(58) Field of Classification Search
CPC ...... G06K 9/6288; G05D 1/021; G08G 1/161; B60W 30/06; B60W 30/0056; B60W 2050/001; B60W 2050/008
See application file for complete search history.

(56) References Cited

U.S. PATENT DOCUMENTS

| 5,917,920 A | 6/1999 | Humphries |
| 6,926,374 B2 | 8/2005 | Dudeck |

(Continued)

FOREIGN PATENT DOCUMENTS

| DE | 10 2013 212710 | 11/2014 |
| DE | 10 2015 001971 | 8/2016 |

(Continued)

OTHER PUBLICATIONS

Ushani, A.K., et al. "Continuous-time Estimation for Dynamic Obstacle Tracking", 2015 IEEE/RSJ International Conference on Intelligent Robots and Systems, pp. 1137-1143, Sep. 28, 2015.

(Continued)

*Primary Examiner* — Ping Y Hsieh
(74) *Attorney, Agent, or Firm* — Hamilton, Brook, Smith & Reynolds, P.C.

(57) ABSTRACT

Previous self-driving car systems can detect objects separately with either vision systems, RADAR systems or LIDAR systems. In an embodiment of the present invention, an object fusion module normalizes sensor output from vision, RADAR, and LIDAR systems into a common format. Then, the system fuses the object-level sensor data across all systems by associating all objects detected and predicting tracks for all objects. The present system improves over previous systems by using the data from all sensors combined to develop a single set of knowledge about the objects around the self-driving car, instead of each sensor operating separately.

20 Claims, 15 Drawing Sheets

(51) Int. Cl.

| | | |
|---|---|---|
| *G06K 9/62* | (2006.01) | |
| *G01S 17/66* | (2006.01) | |
| *G01S 13/931* | (2020.01) | |
| *G06T 7/70* | (2017.01) | |
| *G01S 7/48* | (2006.01) | |
| *G01S 13/86* | (2006.01) | |
| *G01S 13/72* | (2006.01) | |
| *G01S 17/86* | (2020.01) | |
| *G01S 17/931* | (2020.01) | |

(52) U.S. Cl.
CPC .......... *G01S 13/867* (2013.01); *G01S 13/931* (2013.01); *G01S 17/66* (2013.01); *G01S 17/86* (2020.01); *G01S 17/931* (2020.01); *G06K 9/00791* (2013.01); *G06K 9/629* (2013.01); *G06T 7/70* (2017.01); *G01S 2013/932* (2020.01); *G01S 2013/9322* (2020.01)

(56) References Cited

U.S. PATENT DOCUMENTS

| | | |
|---|---|---|
| 8,493,198 B1 | 7/2013 | Juan |
| 9,120,485 B1 | 9/2015 | Dolgov |
| 9,151,626 B1 | 10/2015 | Kojo |
| 9,195,894 B2 | 11/2015 | Yasquez |
| 9,381,916 B1* | 7/2016 | Zhu .................. B60W 30/0956 |
| 9,428,186 B2 | 8/2016 | Breed |
| 9,460,616 B1 | 8/2016 | Tomohiro |
| 10,101,745 B1 | 10/2018 | Sun |
| 10,377,735 B2 | 8/2019 | Jones |
| 2002/0065603 A1 | 5/2002 | Watanabe |
| 2004/0167688 A1 | 9/2004 | Karlsson |
| 2006/0092295 A1 | 5/2006 | Mercer |
| 2008/0009965 A1 | 1/2008 | Bruemmer |
| 2008/0243378 A1 | 10/2008 | Zavoli |
| 2009/0292468 A1 | 11/2009 | Wu |
| 2010/0034426 A1 | 2/2010 | Takiguchi |
| 2010/0063652 A1* | 3/2010 | Anderson .......... A61B 5/02055 701/2 |
| 2010/0164789 A1 | 7/2010 | Basnayake |
| 2010/0256852 A1 | 10/2010 | Mudalige |
| 2011/0190972 A1 | 8/2011 | Timmons |
| 2012/0287280 A1 | 11/2012 | Essati |
| 2012/0291049 A1 | 11/2012 | Park |
| 2012/0310504 A1 | 12/2012 | Duhadway |
| 2012/0310516 A1 | 12/2012 | Zeng |
| 2014/0055276 A1 | 2/2014 | Logan |
| 2014/0142839 A1 | 5/2014 | Kaminade |
| 2014/0195138 A1* | 7/2014 | Stelzig ................. G08G 1/0116 701/119 |
| 2014/0231576 A1 | 8/2014 | Rinker |
| 2014/0309836 A1 | 10/2014 | Ollis |
| 2015/0254986 A1* | 9/2015 | Fairfield .................. G08G 1/22 707/687 |
| 2015/0369609 A1 | 12/2015 | Roumeliotis |
| 2015/0378015 A1 | 12/2015 | You et al. |
| 2016/0047657 A1 | 2/2016 | Caylor |
| 2017/0139411 A1 | 5/2017 | Hartung |
| 2017/0277193 A1 | 9/2017 | Frazzoli |
| 2017/0277195 A1 | 9/2017 | Frazzoli |
| 2018/0024564 A1 | 1/2018 | Matsuda |
| 2018/0063458 A1 | 3/2018 | Shida |
| 2018/0086336 A1 | 3/2018 | Jones |
| 2018/0087907 A1 | 3/2018 | Debitetto et al. |
| 2018/0089538 A1 | 3/2018 | Graham |
| 2018/0314247 A1 | 11/2018 | Sun |
| 2019/0220462 A1 | 7/2019 | Sun |

FOREIGN PATENT DOCUMENTS

| | | |
|---|---|---|
| EP | 2731088 | 5/2014 |
| JP | 2016068774 | 5/2016 |
| JP | 2016115143 | 6/2016 |
| JP | 2016149110 | 8/2016 |
| WO | 2012172632 | 12/2012 |
| WO | 2015008290 | 1/2015 |
| WO | 2016110728 | 6/2015 |
| WO | 201819941 | 1/2018 |

OTHER PUBLICATIONS

Ward, E., et al., "Vehicle Localization with Low Cost Radar Sensors", 2016 IEEE Intelligent Vehicles Symposium, pp. 864-870, Jun. 19, 2016.

Dissanayake, M.W.M.G., et al., "A Solution to the Simultaneous Localization and Map Building (SLAM) Problem", IEEE Transactions on Robotics and Automation, pp. 229-241, Jan. 1, 2001.

Mouikis, A.I., et al. "A Multi-State Constraint Kalman Filter for Vision-aided Inertial Navigation", 2007 IEEE International Conference on Robotics and Automation, pp. 3565-3572, Apr. 10-14, 2007.

International Search Report and Written Opinion for PCT/US2106/054438 entitled Autonomous Vehicle: Vehicle Localization dated Sep. 21, 2017.

International Search Report and Written Opinion of PCT/US2016/054466 dated May 30, 2017 entitled "Autonomous Vehicle with Modular Architecture".

International Search Report and Written Opinion of PCT/US2016/054423 dated Jun. 8, 2017 entitled "Autonomous Vehicle: Object-Level Fusion".

* cited by examiner

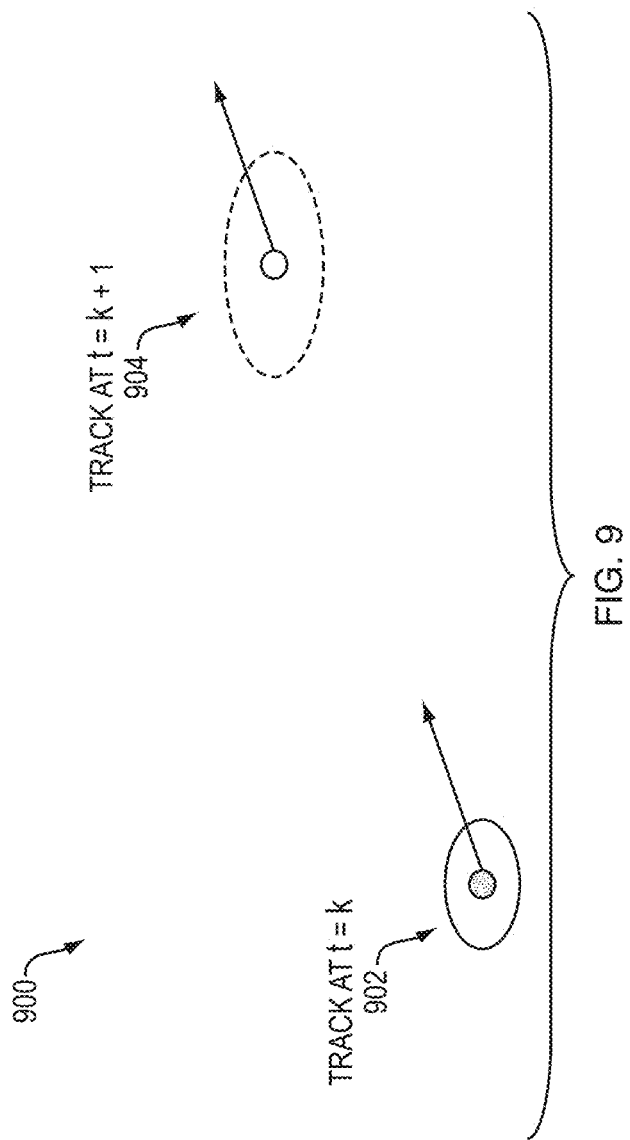

STEP 1: CALCULATE ASSOCIATION SCORES FOR EACH TRACK/MEASUREMENT PAIR

AUTONOMOUS VEHICLE: OBJECT-LEVEL FUSION

RELATED APPLICATIONS

This application is related to "Autonomous Vehicle: Vehicle Localization" by Paul DeBitetto, Matthew Graham, Troy Jones, and Peter Lommel, and "Autonomous Vehicle: Modular Architecture" by Troy Jones, Scott Lennox, John Sgueglia, and Jon Demerly, all co-filed on Sep. 29, 2016

The entire teachings of the above applications are incorporated herein by reference.

BACKGROUND

Currently, vehicles can employ automated systems such as lane assist, pre-collision breaking, and rear cross-track detection. These systems can assist a driver of the vehicle from making human error and to avoid crashes with other vehicles, moving objects, or pedestrians. However, these systems only automate certain vehicle functions, and still rely on the driver of the vehicle for other operations.

SUMMARY

In an embodiment, a method includes converting sensor data of detected objects from a plurality of heterogeneous sensors to a common coordinate frame. The method includes predicting position, velocity, orientation and bounding boxes of existing object tracks at a current measurement time. The method further includes associating detected objects to existing object tracks by determining a similarity of at least two of kinematic information, geometric information, and object classification information based on the converted sensor data. The method further includes updating the kinematic, geometric and object classification information for object tracks that are associated to detected objects. The method further includes reporting a fused object list having a resulting set of updated object tracks. In an embodiment, the method, system, and computer readable medium are for providing situational awareness in an autonomous vehicle.

In an embodiment, the method includes initiating new object tracks for detected objects that are unassociated to existing object tracks.

In an embodiment, the method includes deleting object tracks that are outside of a field-of-view of the one or more heterogeneous sensors view of the autonomous vehicle.

In an embodiment, the method includes deleting the object tracks further includes exempting object tracks from deletion if the object tracks are within a blind spot of the one or more heterogeneous sensors.

In an embodiment, associating detected objects to existing object tracks further determines a similarity of at least three of kinematic information, geometric information, and object classification information.

In an embodiment, the method includes associating detected feature tracks to existing object tracks by determining a similarity of at least two of kinematic information, geometric information, and object classification information.

In an embodiment, kinematic information includes position information, velocity, information, and orientation information, geometric information includes bounding boxes and object contours, and object classification information includes an object type.

In an embodiment, a system for analyzing detected objects to provide situational awareness for an autonomous vehicle includes a preprocessing module configured to convert sensor data of detected objects from a plurality of heterogeneous sensors to a common coordinate frame. The system further includes a track prediction module configured to predict position, velocity, orientation and bounding boxes of existing object tracks at a current measurement time. The system further includes a data association module configured to associate detected objects to existing object tracks by determining a similarity of at least two of kinematic information, geometric information, and object classification information using the converted sensor data. The system further includes a track update module configured to update the kinematic, geometric and object classification information for object tracks that are associated to detected objects. The system further includes a reporting module configured to report a fused object list having a resulting set of updated object tracks.

In an embodiment, a non-transitory computer-readable medium is configured to store instructions for operating an autonomous vehicle. The instructions, when loaded and executed by a processor, causes the processor to convert sensor data of detected objects from a plurality of heterogeneous sensors to a common coordinate frame. The instructions further cause the processor to predict position, velocity, orientation and bounding boxes of existing object tracks at a current measurement time. The instructions further cause the processor to associate detected objects to existing object tracks by determining a similarity of at least two of kinematic information, geometric information, and object classification information based on the converted sensor data. The instructions further cause the processor to update the kinematic, geometric and object classification information for object tracks that are associated to detected objects. The instructions further cause the processor to report a fused object list having a resulting set of updated object tracks.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 9 is a block diagram illustrating an embodiment of track prediction.

DETAILED DESCRIPTION

A description of example embodiments of the invention follows.

Figure 1:
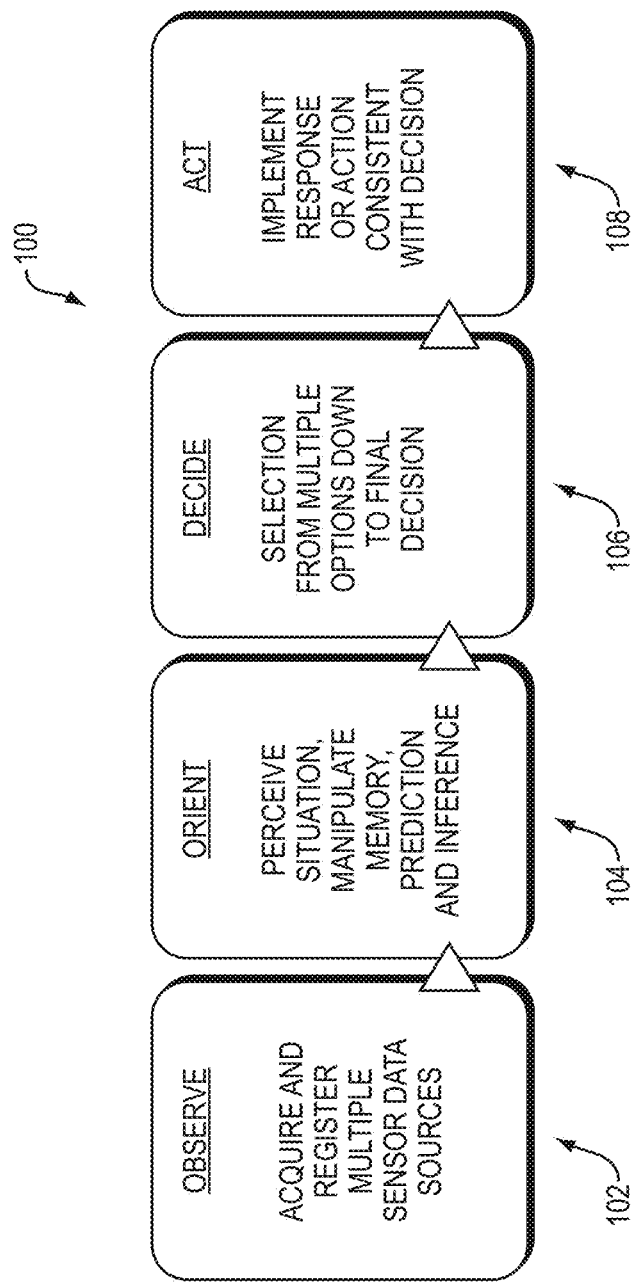
FIG. 1 is a diagram illustrating steps in an embodiment of an automated control system of the Observe, Orient, Decide, and Act (OODA) model.
Figure 2:
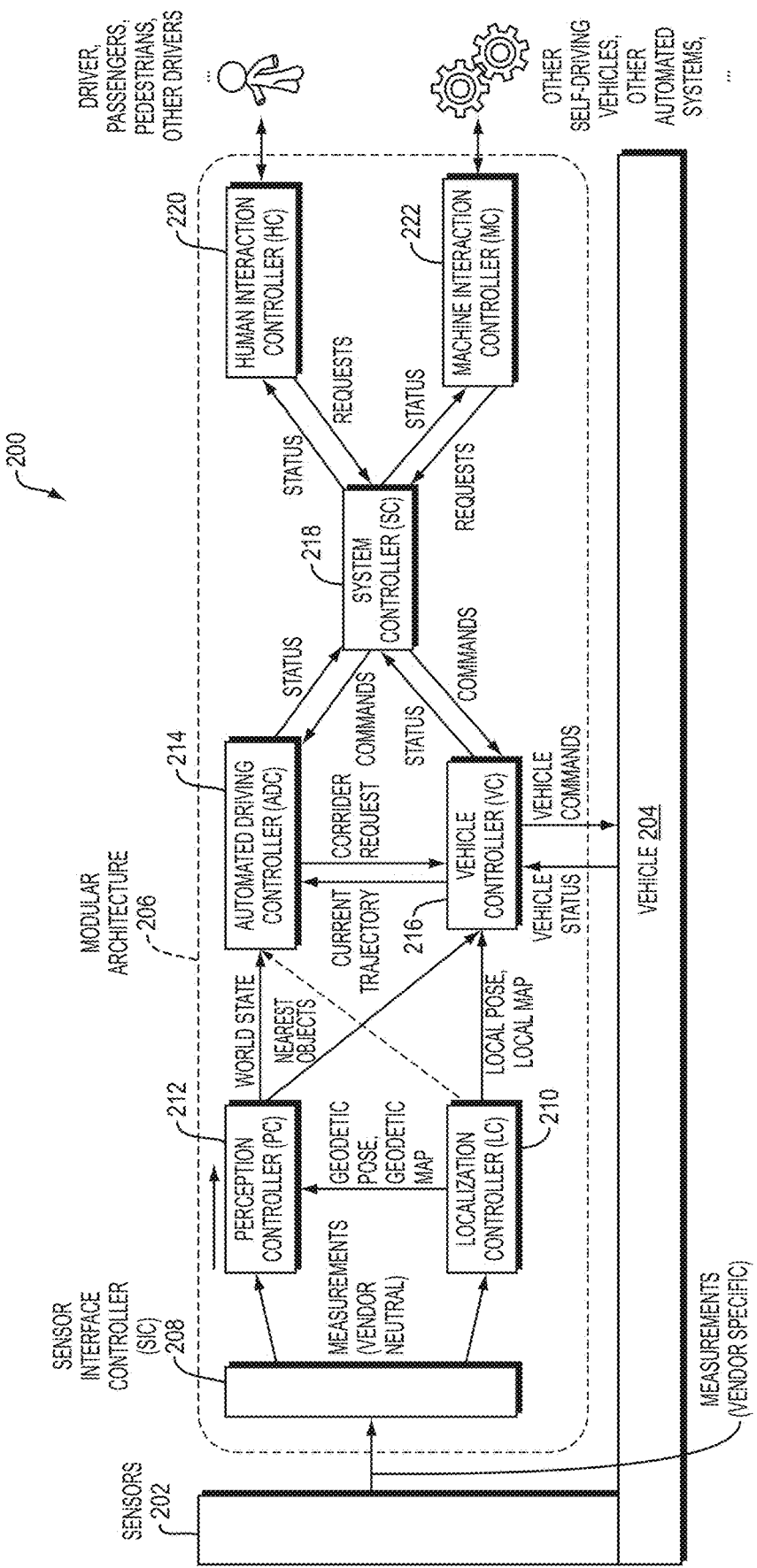
FIG. 2 is a block diagram of an embodiment of an autonomous vehicle high-level architecture.

FIG. 1 is a diagram illustrating steps in an embodiment of an automated control system of the Observe, Orient, Decide, and Act (OODA) model. Automated systems, such as highly-automated driving systems, or, self-driving cars, or autonomous vehicles, employ an OODA model. The observe virtual layer 102 involves sensing features from the world using machine sensors, such as laser ranging, radar, infrared, vision systems, or other systems. The orientation virtual layer 104 involves perceiving situational awareness based on the sensed information. Examples of orientation virtual layer activities are Kalman filtering, model based matching, machine or deep learning, and Bayesian predictions. The decide virtual layer 106 selects an action from multiple objects to a final decision. The act virtual layer 108 provides guidance and control for executing the decision. FIG. 2 is a block diagram 200 of an embodiment of an autonomous vehicle high-level architecture 206. The architecture 206 is built using a top-down approach to enable fully automated driving. Further, the architecture 206 is preferably modular such that it can be adaptable with hardware from different vehicle manufacturers. The architecture 206, therefore, has several modular elements functionally divided to maximize these properties. In an embodiment, the modular architecture 206 described herein can interface with sensor systems 202 of any vehicle 204. Further, the modular architecture 206 can receive vehicle information from and communicate with any vehicle 204.

Elements of the modular architecture 206 include sensors 202, Sensor Interface Controller (SIC) 208, localization controller (LC) 210, perception controller (PC) 212, automated driving controller 214 (ADC), vehicle controller 216 (VC), system controller 218 (SC), human interaction controller 220 (HC) and machine interaction controller 222 (MC).

Referring again to the CODA model of FIG. 1, in terms of an autonomous vehicle, the observation layer of the model includes gathering sensor readings, for example, from vision sensors, Radar (Radio Detection And Ranging), LIDAR (Light Detection And Ranging), and Global Positioning Systems (GPS). The sensors 202 shown in FIG. 2 shows such an observation layer. Examples of the orientation layer of the model can include determining where a car is relative to the world, relative to the road it is driving on, and relative to lane markings on the road, shown by Perception Controller (PC) 212 and Localization Controller (LC) 210 of FIG. 2. Examples of the decision layer of the model include determining a corridor to automatically drive the car, and include elements such as the Automatic Driving Controller (ADC) 214 and Vehicle Controller (VC) 216 of FIG. 2. Examples of the act layer include converting that corridor into commands to the vehicle's driving systems (e.g., steering sub-system, acceleration sub-system, and breaking sub-system) that direct the car along the corridor, such as actuator control 410 of FIG. 4. A person of ordinary skill in the art can recognize that the layers of the system are not strictly sequential, and as observations change, so do the results of the other layers. For example, after the system chooses a corridor to drive in, changing conditions on the road, such as detection of another object, may direct the car to modify its corridor, or enact emergency procedures to prevent a collision. Further, the commands of the vehicle controller may need to be adjusted dynamically to compensate for drift, skidding, or other changes to expected vehicle behavior.

At a high level, the module architecture 206 receives measurements from sensors 202. While different sensors may output different sets of information in different formats, the modular architecture 206 includes Sensor Interface Controller (SIC) 208, sometimes also referred to as a Sensor Interface Server (SIS), configured to translate the sensor data into data having a vendor-neutral format that can be read by the modular architecture 206. Therefore, the modular architecture 206 learns about the environment around the vehicle 204 from the vehicle's sensors, no matter the vendor, manufacturer, or configuration of the sensors. The SIS 208 can further tag each sensor's data with a metadata tag having its location and orientation in the car, which can be used by the perception controller to determine the unique angle, perspective, and blind spot of each sensor.

Further, the modular architecture 206 includes vehicle controller 216 (VC). The VC 216 is configured to send commands to the vehicle and receive status messages from the vehicle. The vehicle controller 216 receives status messages from the vehicle 204 indicating the vehicle's status, such as information regarding the vehicle's speed, attitude, steering position, braking status, and fuel level, or any other information about the vehicle's subsystems that is relevant for autonomous driving. The modular architecture 206, based on the information from the vehicle 204 and the sensors 202, therefore can calculate commands to send from the VC 216 to the vehicle 204 to implement self-driving. The functions of the various modules within the modular architecture 206 are described in further detail below. However, when viewing the modular architecture 206 at a high level, it receives (a) sensor information from the sensors 202 and (b) vehicle status information from the vehicle 204, and in turn, provides the vehicle instructions to the vehicle 204. Such an architecture allows the modular architecture to be employed for any vehicle with any sensor configuration. Therefore, any vehicle platform that includes a sensor subsystem (e.g., sensors 202) and an actuation subsystem having the ability to provide vehicle status and accept driving commands (e.g., actuator control 410 of FIG. 4) can integrate with the modular architecture 206.

Within the modular architecture 206, various modules work together to implement automated driving according to the CODA model. The sensors 202 and SIC 208 reside in the "observe" virtual layer. As described above, the SIC 208 receives measurements (e.g., sensor data) having various formats. The SIC 208 is configured to convert vendor-specific data directly from the sensors to vendor-neutral data. In this way, the set of sensors 202 can include any brand of Radar, LIDAR, image sensor, or other sensors, and the modular architecture 206 can use their perceptions of the environment effectively.

Figure 3:
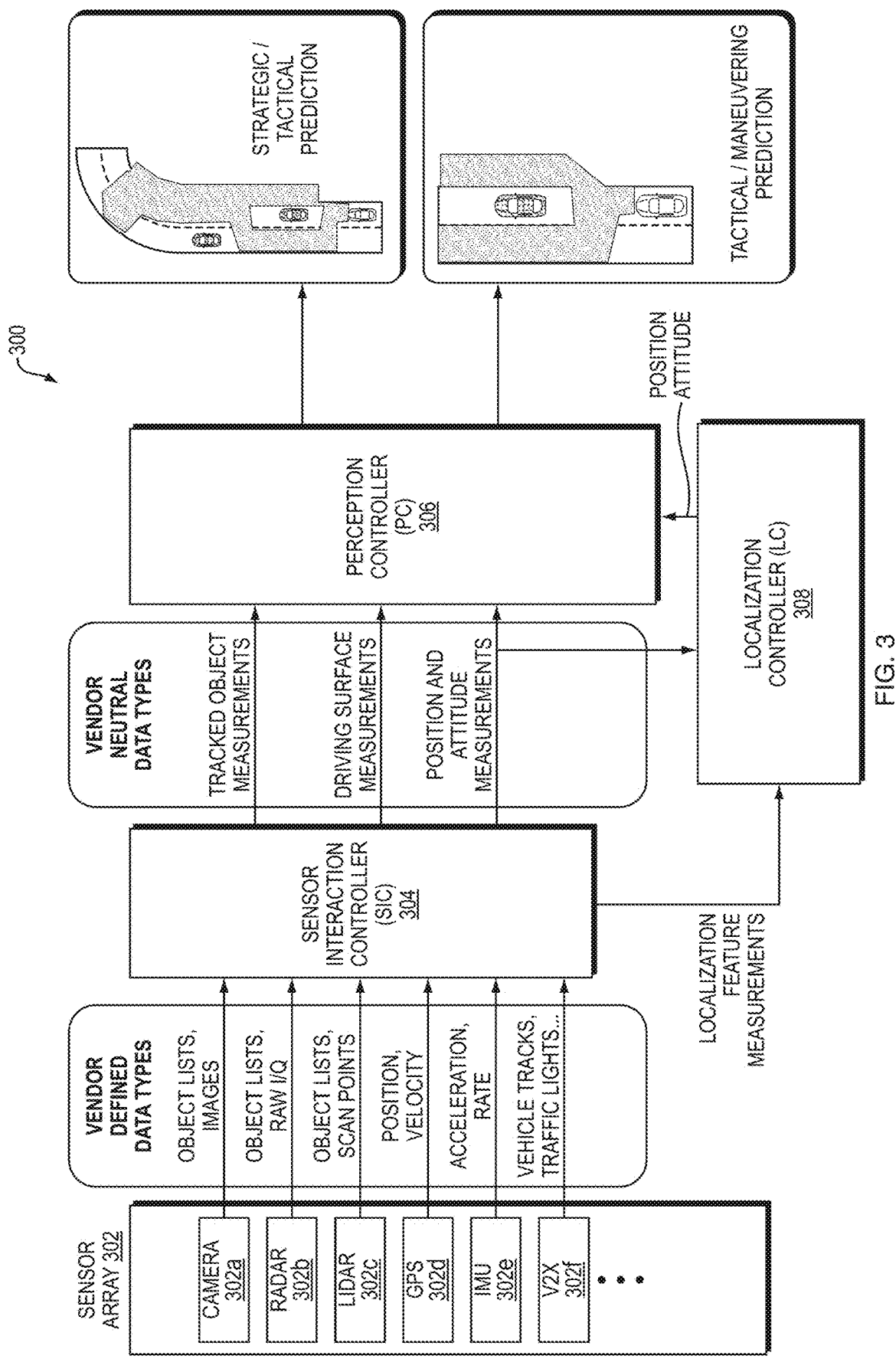
FIG. 3 is a block diagram illustrating an embodiment of the sensor interaction controller (SIC), perception controller (PC), and localization controller (LC).

The measurements output by the sensor interface server are then processed by perception controller (PC) 212 and localization controller (LC) 210. The PC 212 and LC 210 both reside in the "orient" virtual layer of the OODA model. The LC 210 determines a robust world-location of the vehicle that can be more precise than a GPS signal, and still determines the world-location of the vehicle when there is no available or an inaccurate GPS signal. The LC 210 determines the location based on GPS data and sensor data. The PC 212, on the other hand, generates prediction models representing a state of the environment around the car, including objects around the car and state of the road. FIG. 3 provides further details regarding the SIC 208, LC 210 and PC 212.

Figure 4:
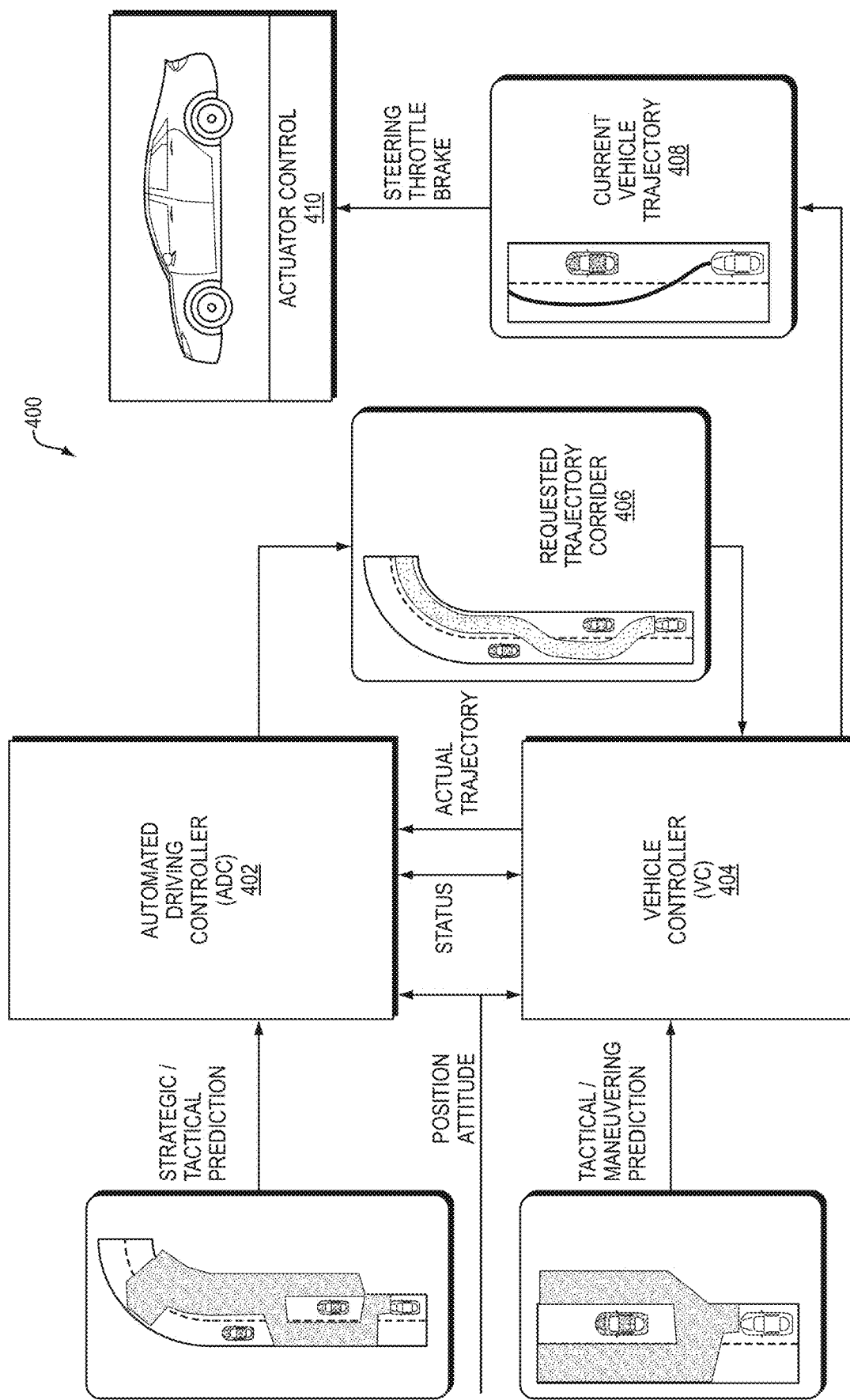
FIG. 4 is a block diagram illustrating an example embodiment of the automatic driving controller (ADC), vehicle controller (VC) and actuator controller.

Automated driving controller 214 (ADC) and vehicle controller 216 (VC) receive the outputs of the perception controller and localization controller. The ADC 214 and VC 216 reside in the "decide" virtual layer of the OODA model. The ADC 214 is responsible for destination selection, route and lane guidance, and high-level traffic surveillance. The ADC 214 further is responsible for lane selection within the route, and identification of safe harbor areas to diver the vehicle in case of an emergency. In other words, the ADC 214 selects a route to reach the destination, and a corridor within the route to direct the vehicle. The ADC 214 passes this corridor onto the VC 216. Given the corridor, the VC 216 provides lower level driving functions to direct the vehicle through the corridor safely. The VC 216 first determines the best way to maneuver through the corridor while providing comfort to the driver, an ability to reach safe harbor, emergency maneuverability, and ability to follow the vehicle's trajectory. In emergency situation, the VC 216 overrides the corridor provided by the ADC 214 and immediately guides the car into a safe harbor corridor, returning to the corridor provided by the ADC 214 when it is safe to do so. The VC 216, after determining how to maneuver the vehicle, including safety maneuvers, then provides actuation commands to the vehicle 204, which executes the commands in its steering, throttle, and braking subsystems. This element of the VC 216 is therefore in the "act" virtual layer of the OODA model. FIG. 4 describes the ADC 214 and VC 216 in further detail.

The modular architecture 206 further coordinates communication with various modules through system controller 218 (SC). By exchanging messages with the ADC 214 and VC 216, the SC 218 enables operation of human interaction controller 220 (HC) and machine interaction controller 222 (MC). The HC 220 provides information about the autonomous vehicle's operation in a human readable format based on status messages coordinated by the system controller. The HC 220 further allows for human input to be factored into the car's decisions. For example, the HC 220 enables the operator of the vehicle to enter or modify the destination or route of the vehicle, as one example. The SC 218 interprets the operator's input and relays the information to the VC 216 or ADC 214 as necessary.

Figure 6:
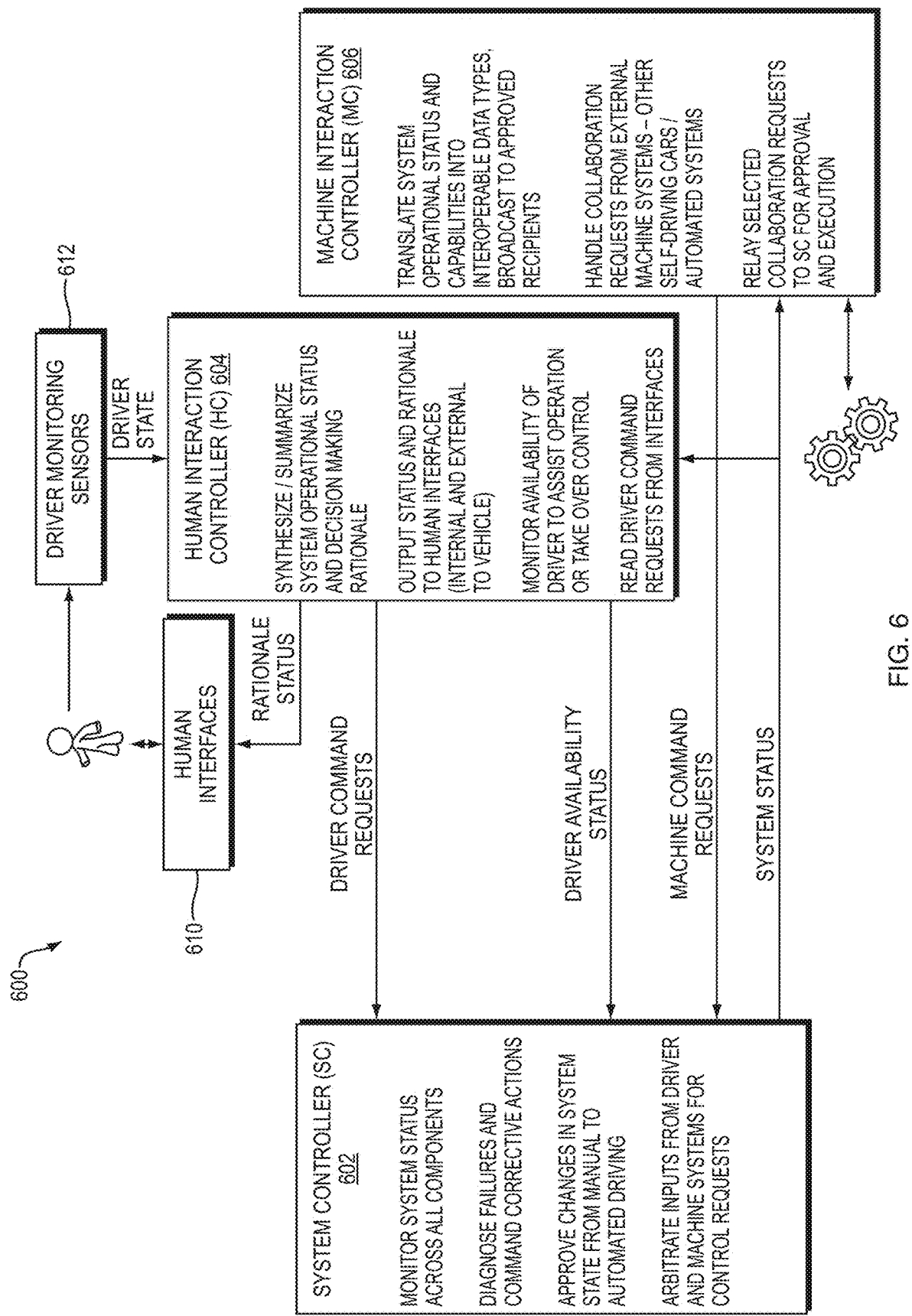
FIG. 6 is a block diagram illustrating an example embodiment of the system controller, human interface controller (HC) and machine interface controller (MC).

Further, the MC 222 can coordinate messages with other machines or vehicles. For example, other vehicles can electronically and wirelessly transmit turn signals to autonomous vehicles, and the MC 222 can receive such information, and relay it to the VC 216 and ADC 214 via the SC 218. In addition, the MC 222 can send information to other vehicles wirelessly. In the example of a turn signal, the MC 222 can receive a notification that the vehicle intends to turn. The MC 222 receives this information via the VC 216 sending a status message to the SC 218, which relays the status to the MC 222. However, other examples of machine communication can also be implemented. For example, other vehicle sensor information or stationary sensors can wirelessly send data to the autonomous vehicle, giving the vehicle a more robust view of the environment. Other machines may be able to transmit information about objects in the vehicles blind spot, for example. In further examples, other vehicles can send their vehicle track. In an even further examples, traffic lights can send a digital signal of their status to aid in the case where the traffic light is not visible to the vehicle. A person of ordinary skill in the art can recognize that any information employed by the autonomous vehicle can also be transmitted to or received from other vehicles to aid in autonomous driving. FIG. 6 shows the HC 220, MC 222, and SC 218 in further detail.

FIG. 3 is a block diagram 300 illustrating an embodiment of the sensor interaction controller 304 (SIC), perception controller (PC) 306, and localization controller (LC) 308. A sensor array 302 of the vehicle can include various types of sensors, such as a camera 302a, radar 302b, LIDAR 302c, GPS 302d, IMU 302e, or vehicle-to-everything (V2X) 302f. Each sensor sends individual vendor defined data types to the SIC 304. For example, the camera 302a sends object lists and images, the radar 302b sends object lists, and in-phase/quadrature (IQ) data, the LIDAR 302c sends object lists and scan points, the GPS 302d sends position and velocity, the IMU 302e sends acceleration data, and the V2X 302f controller sends tracks of other vehicles, turn signals, other sensor data, or traffic light data. A person of ordinary skill in the art can recognize that the sensor array 302 can employ other types of sensors, however. The SIC 304 monitors and diagnoses faults at each of the sensors 302a-f. In addition, the SIC 304 isolates the data from each sensor from its vendor specific package and sends vendor neutral data types to the perception controller (PC) 306 and localization controller 308 (LC). The SIC 304 forwards localization feature measurements and position and attitude measurements to the LC 308, and forwards tracked object measurements, driving surface measurements, and position & attitude measurements to the PC 306. The SIC 304 can further be updated with firmware so that new sensors having different formats can be used with the same modular architecture.

The LC 308 fuses GPS and IMU data with Radar, Lidar, and Vision data to determine a location in GPS location, and to increase the precision of the GPS location. The LC 308 then reports that robust determined location, velocity, and attitude to the PC 306. The LC 308 further monitors measurements representing position, velocity, and attitude data for accuracy relative to each other, such that if one sensor measurement fails or becomes degraded, such as a GPS signal in a city, the LC 308 can correct for it. The PC 306 identifies and locates objects around the vehicle based on the sensed information. The PC 306 further estimates drivable surface regions surrounding the vehicle, and further estimates other surfaces such as road shoulders or drivable terrain in the case of an emergency. The PC 306 further provides a stochastic prediction of future locations of objects. The PC 306 further stores a history of objects and drivable surfaces.

The PC 306 outputs two predictions, a strategic prediction, and a tactical prediction. The tactical prediction represents the world around 2-4 seconds into the future, which only predicts the nearest traffic and road to the vehicle. This prediction includes a free space harbor on shoulder of the road or other location.

The strategic prediction is a long term prediction that predicts areas of the car's visible environment beyond the visible range. This prediction is for greater than four seconds into the future, but has a higher uncertainty than the tactical prediction because objects (e.g., cars and people) may change their currently observed behavior in an unanticipated manner. The strategic prediction has higher uncertainty because it assumes that currently observed behavior continues for the entire prediction period. Such a prediction can also be based on sensor measurements from external sources including other autonomous vehicles, manual vehicles with a sensor system and sensor communication network, sensors positioned near or on the roadway or received over a network from transponders on the objects, and traffic lights, signs, or other signals configured to communicate wirelessly with the autonomous vehicle.

FIG. 4 is a block diagram 400 illustrating an example embodiment of the automatic driving controller (ADC) 402, vehicle controller (VC) 404 and actuator controller 410. The ADC 402 and VC 404 execute the "decide" virtual layer of the CODA model.

The ADC 402, based on destination input by the operator and current position, first creates an overall route from the current position to the destination including a list of roads and junctions between roads in order to reach the destination. This strategic route plan may be based on traffic conditions, and can change based on updating traffic conditions, however such changes are generally enforced for large changes in estimated time of arrival (ETA). Next, the ADC 402 plans a safe, collision-free, corridor for the autonomous vehicle to drive through based on the surrounding objects and permissible drivable surface—both supplied by the PC. This corridor is continuously sent as a request to the VC 404 and is updated as traffic and other conditions change. The VC 404 receives the updates to the corridor in real time. The ADC 402 receives back from the VC 404 the current actual trajectory of the vehicle, which is also used to modify the next planned update to the driving corridor request.

The ADC 402 generates a strategic corridor for the vehicle to navigate. The ADC 402 generates the corridor based on predictions of the free space on the road in the strategic/tactical prediction. The ADC 402 further receives the vehicle position information and vehicle attitude information from the perception controller of FIG. 3. The VC 404 further provides the ADC 402 with an actual trajectory of the vehicle from the vehicle's actuator control 410. Based on this information, the ADC 402 calculates feasible corridors to drive the road. In the example of being on an empty road, the corridor may follow the lane ahead of the car.

In another example of the car needing to pass out a car, the ADC 402 can determine whether there is free space in a passing lane and in front of the car to safely execute the pass. The ADC 402 can automatically calculate based on (a) the current distance to the car to be passed, (b) amount of drivable road space available in the passing lane, (c) amount of free space in front of the car to be passed, (d) speed of the vehicle to be passed, (e) current speed of the autonomous vehicle, and (f) known acceleration of the autonomous vehicle, a corridor for the vehicle to travel through to execute the pass maneuver.

In another example, the ADC 402 can determine a corridor to switch lanes when approaching a highway exit. In addition to all of the above factors, the ADC 402 monitors the planned route to the destination and, upon approaching a junction, calculates the best corridor to safely and legally continue on the planned route.

The ADC 402 further calculates a tactical trajectory within the corridor, which allows the vehicle to maintain a safe separation between objects. The tactical trajectory also includes a backup safe harbor trajectory in the case of an emergency, such as a vehicle unexpectedly decelerating or stopping, or another vehicle swerving in front of the autonomous vehicle.

The ADC 402 the provides the requested trajectory corridor 406 to the VC 404, which works in tandem with the ADC 402 to allow the vehicle to navigate the corridor. The requested trajectory corridor 406 places geometric and velocity constraints on trajectory for a number of seconds into the future. The VC 404 determines a route to maneuver within the corridor 406. The VC 404 bases its maneuvering decisions from the tactical/maneuvering prediction received from the perception controller and the position of the vehicle and the attitude of the vehicle. As described previously, the tactical/maneuvering prediction is for a shorter time period, but has less uncertainty. Therefore, for lower-level maneuvering and safety calculations, the VC 404 effectively uses the tactical/maneuvering prediction to plan collision-free trajectories within requested corridor 406. As needed in emergency situations, the VC 404 plans trajectories outside the corridor 406 to avoid collisions with other objects.

The VC 404 then determines, based on the requested corridor 406, the current velocity and acceleration of the car, and the nearest objects, how to drive the car through that corridor 406 while avoiding collisions with objects and remain on the drivable surface. As necessary to avoid collisions, the VC 404 may be required to command a maneuver suddenly outside of the requested corridor from the ADC 402. This emergency maneuver can be initiated entirely by the VC 404 as it has faster response times than the ADC 402 to imminent collision threats. This capability isolates the safety critical collision avoidance responsibility within the VC 404. The VC 404 sends maneuvering commands to the actuators that control steering, throttling, and braking of the vehicle platform.

The VC 404 executes its maneuvering strategy by sending a current vehicle trajectory 408 having driving commands (e.g., steering, throttle, braking) to the vehicle's actuator controls 410. The vehicle's actuator controls 410 apply the commands to the car's respective steering, throttle, and braking systems. The VC 404 sending the trajectory 408 to the actuator controls represent the "Act" virtual layer of the CODA model. By conceptualizing the autonomous vehicle architecture in this way, the VC is the only component needing configuration to control a specific model of car (e.g., format of each command, acceleration performance, turning performance, and braking performance), whereas the ADC remaining highly agnostic to the specific vehicle capacities. In an example, the VC 404 can be updated with firmware configured to allow interfacing with particular vehicle's actuator control systems, or a fleet-wide firmware update for all vehicles.

Figure 5:
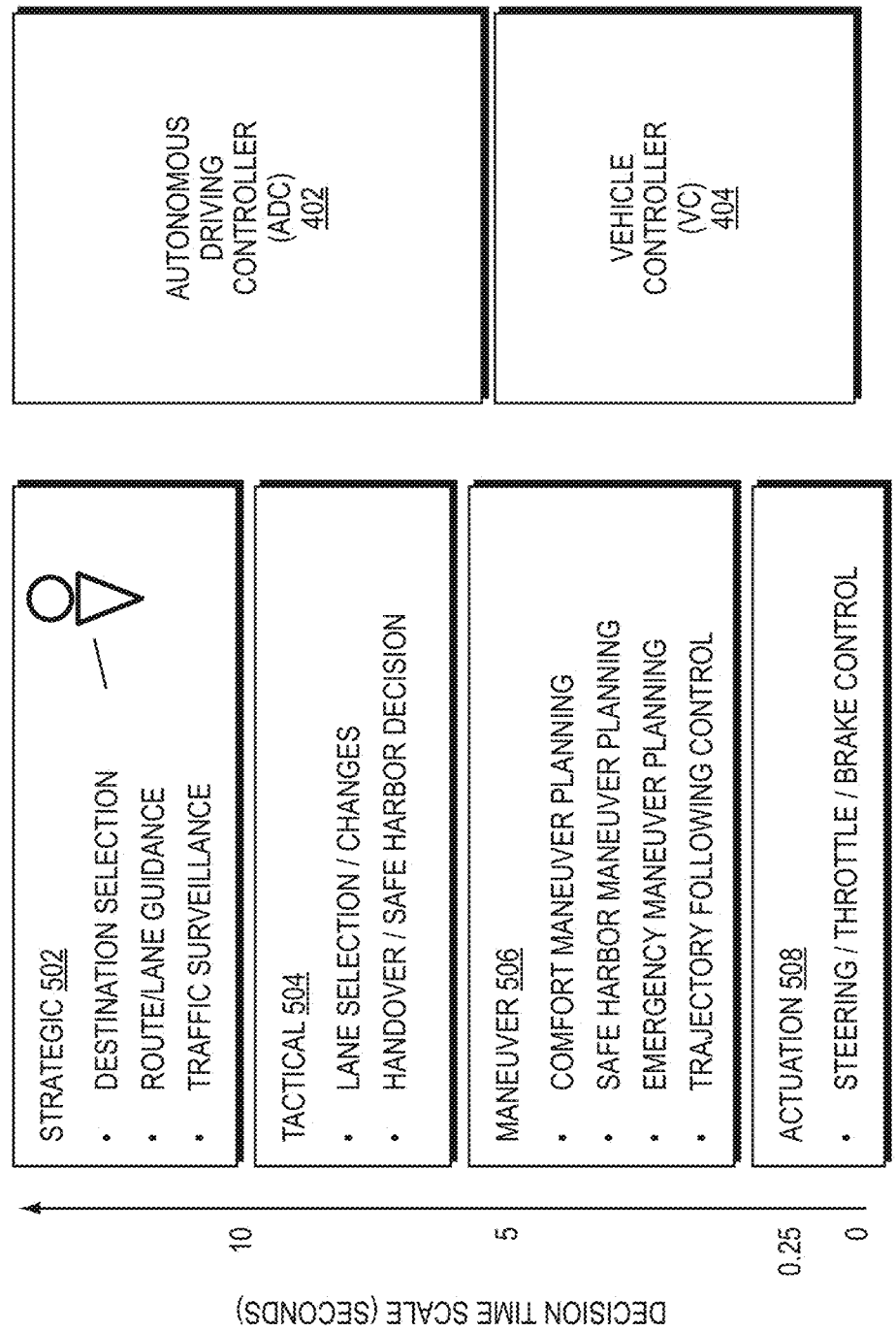
FIG. 5 is a diagram illustrating decision time scales of the ADC and VC.

FIG. 5 is a diagram 500 illustrating decision time scales of the ADC 402 and VC 404. The ADC 402 implements higher-level, strategic 502 and tactical 504 decisions by generating the corridor. The ADC 402 therefore implements the decisions having a longer range/or time scale. The estimate of world state used by the ADC 402 for planning strategic routes and tactical driving corridors for behaviors such as passing or making turns has higher uncertainty, but predicts longer into the future, which is necessary for planning these autonomous actions. The strategic predictions have high uncertainty because they predict beyond the car's visible range, relying solely on non-vision technologies, such as Radar, for predictions of objects far away from the car. Many tactical decisions, such as passing a car at highway speed, require perception Beyond the Visible Range (BVR) of an autonomous vehicle (e.g., 100 m or greater), whereas all maneuverability 506 decisions are made based on locally perceived objects to avoid collisions.

The VC 404, on the other hand, generates maneuverability decisions 506 using maneuverability predictions that are short time frame/range predictions of object behaviors and the driving surface. These maneuverability predictions have a lower uncertainty because of the shorter time scale of the predictions, however, they rely solely on measurements taken within visible range of the sensors on the autonomous vehicle. Therefore, the VC 404 uses these maneuverability predictions (or estimates) of the state of the environment immediately around the car for fast response planning of collision-free trajectories for the autonomous vehicle. The VC 402 issues actuation commands, on the lowest end of the time scale, representing the execution of the already planned corridor and maneuvering through the corridor.

FIG. 6 is a block diagram 600 illustrating an example embodiment of the system controller 602, human interface controller 604 (HC) and machine interface controller 606 (MC). The human interaction controller 604 (HC) receives input command requests from the operator and provides outputs to the operator, passengers of the vehicle, and humans external to the autonomous vehicle. The HC 604 provides the operator and passengers (via visual, audio, haptic, or other interfaces) a human-understandable representation of the system status and rationale of the decision making of the autonomous vehicle. For example, the HC 604 can display the vehicle's long-term route, or planned corridor and safe harbor areas. Additionally, the HC 604 reads sensor measurements about the state of the driver, allowing the HC 604 to monitor the availability of the driver to assist with operations of the car at any time. As one example, a sensor system within the vehicle could sense whether the operator has hands on the steering wheel. If so, the HC 604 can signal that a transition to operator steering can be allowed, but otherwise, the HC 604 can prevent a turnover of steering controls to the operator. In another example, the HC 604 can synthesize and summarize decision making rationale to the operator, such as reasons why it selected a particular route.

The machine interaction controller 606 (MC) interacts with other autonomous vehicles or automated system to coordinate activities such as formation driving or traffic management. The MC 606 reads the internal system status and generates an output data type that can be read by collaborating machine systems, such as the V2X data type. This status can be broadcast over a network by collaborating systems. The MC 606 can translate any command requests from external machine systems (e.g., slow down, change route, merge request, traffic signal status) into commands requests routed to the SC for arbitration against the other command requests from the HC 604. The MC 606 can further authenticate (e.g., using signed messages from other trusted manufacturers) messages from other systems to ensure that they are valid and represent the environment around the car. Such an authentication can prevent tampering from hostile actors.

The system controller 602 (SC) serves as an overall manager of the elements within the architecture. The SC 602 aggregates the status data from all of the system elements to determine total operational status, and sends commands to the elements to execute system functions. If elements of the system report failures, the SC 602 initiates diagnostic and recovery behaviors to ensure autonomous operation such that the vehicle remains safe. Any transitions of the vehicle to/from an automated state of driving are approved or denied by the SC 602 pending the internal evaluation of operational readiness for automated driving and the availability of the human driver.

Figure 7:
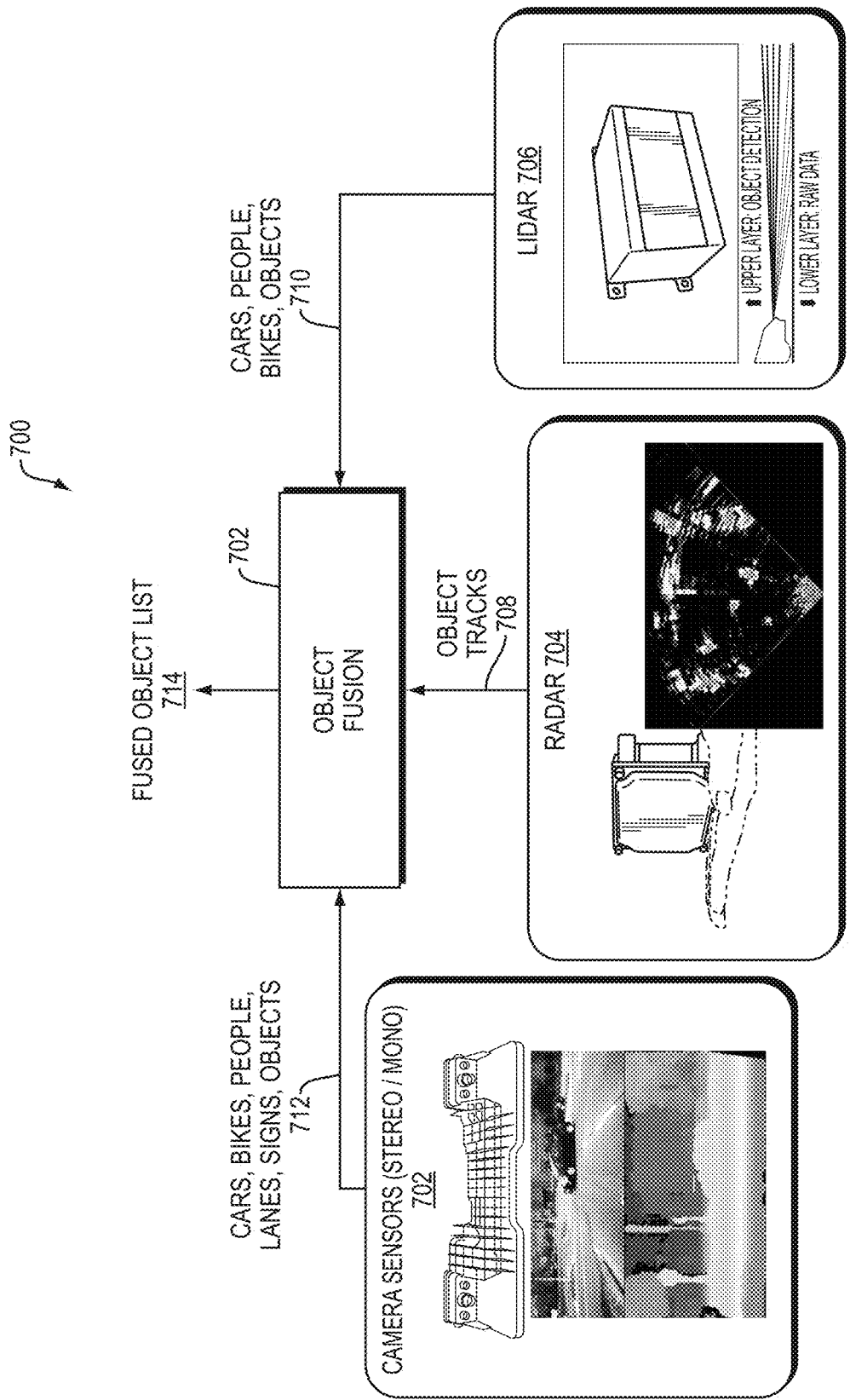
FIG. 7 is a block diagram illustrating an embodiment of an object fusion filter.

In an embodiment of the present invention, a system and method fuses objects in a perception layer/module. FIG. 7 is a block diagram 700 illustrating an example embodiment of the object level fusion server 702 receiving information from all sensors, such as vision sensors 702, LIDAR 706, and RADAR 704. In an example embodiment, the sensors include two stereo vision sensors, RADAR, and LIDAR. Stereo vision 702 uses imaging technology to output bounded boxes of objects (e.g., cars, bikes, people, lanes, signs, and objects) found in the field of view of the cameras. The RADAR systems 704 track locations and ranges of any objects that reflect RADAR—but cannot classify or identify those objects. The LIDAR system 706 can recognize cars, bikes, or other objects and provides object classifications of the same.

Figure 8A:
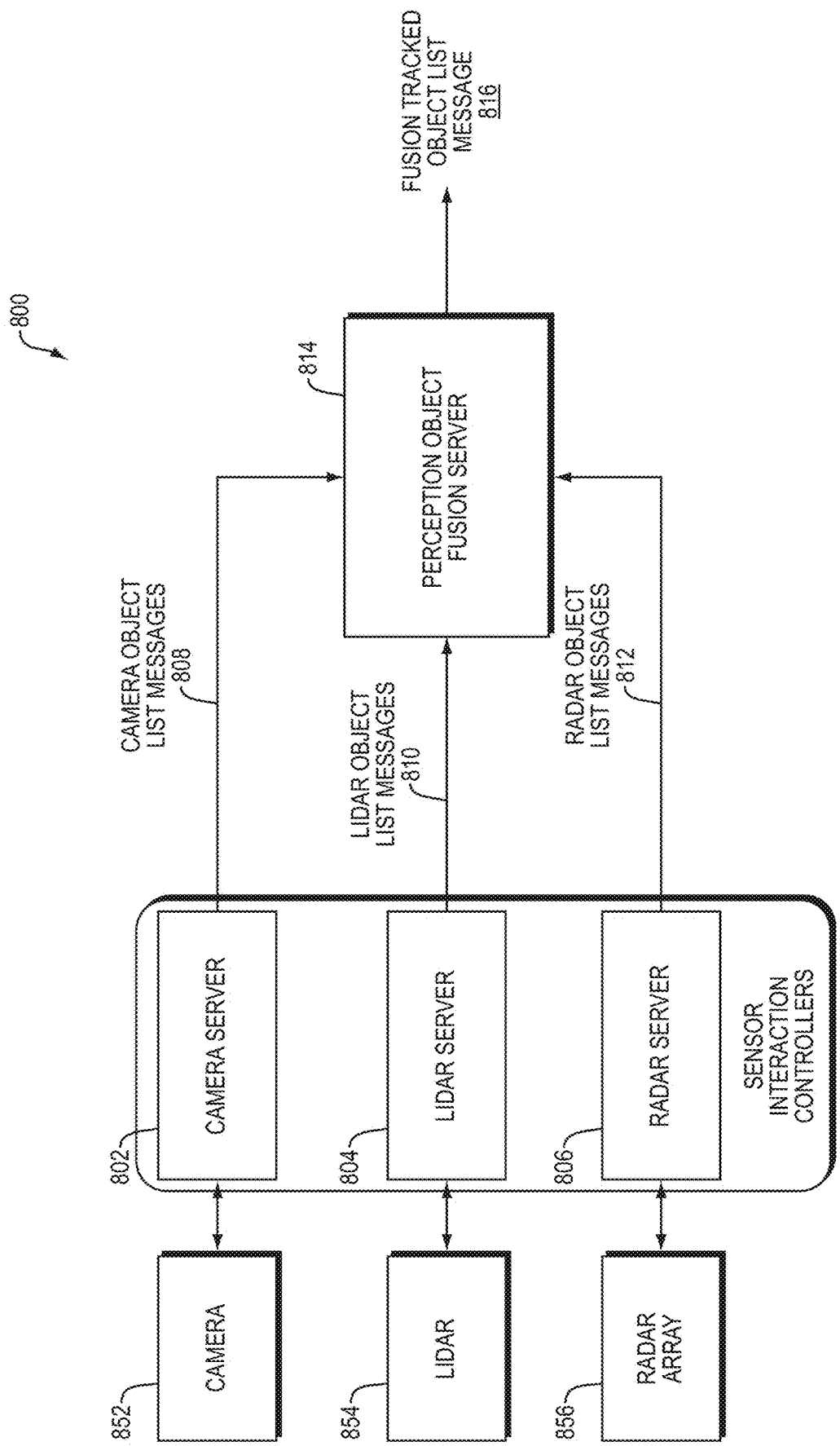
FIG. 8A is a block diagram illustrating an embodiment of an object fusion server design.

FIG. 8A is a block diagram 800 illustrating an example embodiment of an object fusion server 814. Each sensor 802, 804, and 806 communicates with a server module that may include a dedicated processor configured to run a tracking loop, process the raw data of each sensor individually, and output object data, instead of raw data of the sensor. In one embodiment, each object output by each sensor server 802, 804, and 806 is in a coordinate system with axes X, Y, and Z, where X is the axis from the back of the car to the front of the car, Y is the axes from the left of the car to the right of the car, and Z is the axis from the ground going upward. However, a person of ordinary skill of the art could envision a coordinate system having different axes configuration, or a spherical or other coordinate system. In other words, each sensor server converts the object data to a message format agnostic of the sensor or sensor's format. The Perception Object Fusion Server 814 then combines the messages into a fusion tracked object list message.

The object fusion module 814 then analyzes all of the data—vision, LIDAR, and RADAR—to determine a complete picture of objects surrounding the self-driving car. Previous object-level fusion systems only used RADAR systems, or only used vision systems, but did not use both. One unique challenge overcome in combining data from all systems is that while LIDAR and RADAR output objects as points within a coordinate-system as well as a range to that point, vision systems output a bounded box that the object is likely within, but having a less accurate range. Therefore, the data of the different systems needs to be associated in an accurate way. For example, RADAR objects that are within bounded boxes can be determined to be the same objects. However, a RADAR ping just outside a bounded box could be a separate object. The object fusion module reconciles the data from all sensors to determine a most likely scenario of all objects near the self-driving car. In an example embodiment, the object fusion module employs Kalman filtering and probabilistic data association. However, multi-hypothesis tracking, probability hypothesis density filtering or other techniques can also be employed in other embodiments.

Figure 8B:
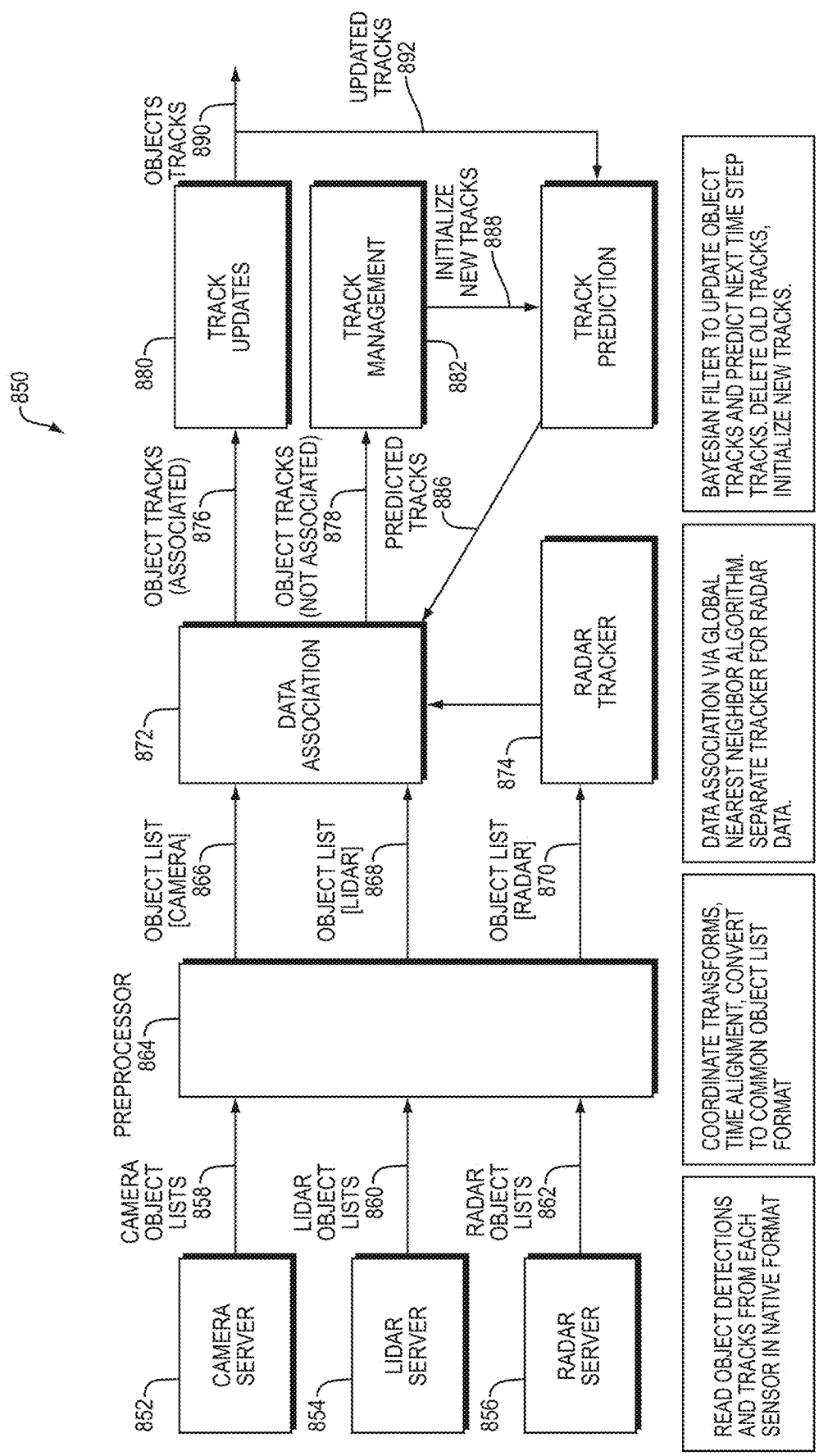
FIG. 8B is a block diagram illustrating an embodiment of an object fusion module.

FIG. 8B is a more detailed block diagram 850 of the object fusion module. Each sensor's object data 858, 860, and 862 is pre-processed by one or more preprocessors 864. Then, with the object data in a uniform format in the object lists 866, 868, and 870, a data association block associates the objects from the three different domains (e.g., LIDAR, RADAR, and Vision System) to determine an object track. A person of ordinary skill in the art can recognize that a radar tracker 874 additionally processes the radar object list 870 before forwarding the data to the data association module 872.

The data association module 872 applies probabilistic data association using a global nearest neighbor method to associate sensor object tracks to existing fused object tracks. The global nearest neighbor method selects the association that maximizes the sum of the similarities for each associated sensor object track and fused object track. The data association module 872 measures the similarity of object tracks using at least two of kinematic information, geometric information, and object classification information based on the converted sensor data. In some embodiments, the data association module 872 measures the similarity of object tracks using all three of kinematic information, geometric information, and object classification information based on the converted sensor data. The data association module 872 sends unassociated object tracks 878 to a track management module 882, which initializes new tracks 888, which are sent to the track prediction module 884. Meanwhile, the data association module 872 associates the remaining objects to existing fused object tracks 876, which are passed to a track update module 880. The track update module 880 sends updated tracks 892 to track prediction module 884. The track update module 880 uses a Bayesian filter to update the object tracks and also to predict next time step tracks. In an example embodiment, the track update module employs a Kalman filter. However, extended Kalman filters, unscented Kalman filters or particle filters could also be employed in other embodiments.

The track prediction module 884 issues a prediction 886 of existing object tracks that are sent to the data association module 872. That prediction is used for data association in future time steps. This loop continues as long as the car is active.

The track update module 880 further removes old tracks when the sensors detect that the object is no longer in view. However, the track update module 880 can create an exception for objects in known blind spots of the sensors.

FIG. 9 is a diagram 900 illustrating track prediction. The goal of track prediction is to track location and velocity of an object at the current measurement time given a most recent tack of estimates. For example, the track prediction module, given a track 902 at time t=k, can estimate the object's location and track 904 at time t=k+1 based on data from data collected at previous times (e.g., recent time steps). However, estimation uncertainty grows after prediction the further out in time the prediction is. A bounding box corresponding with the object should increase, and a degree of certainty corresponding to the object decreases as the prediction is further distant in time from the present.

Figure 10A:
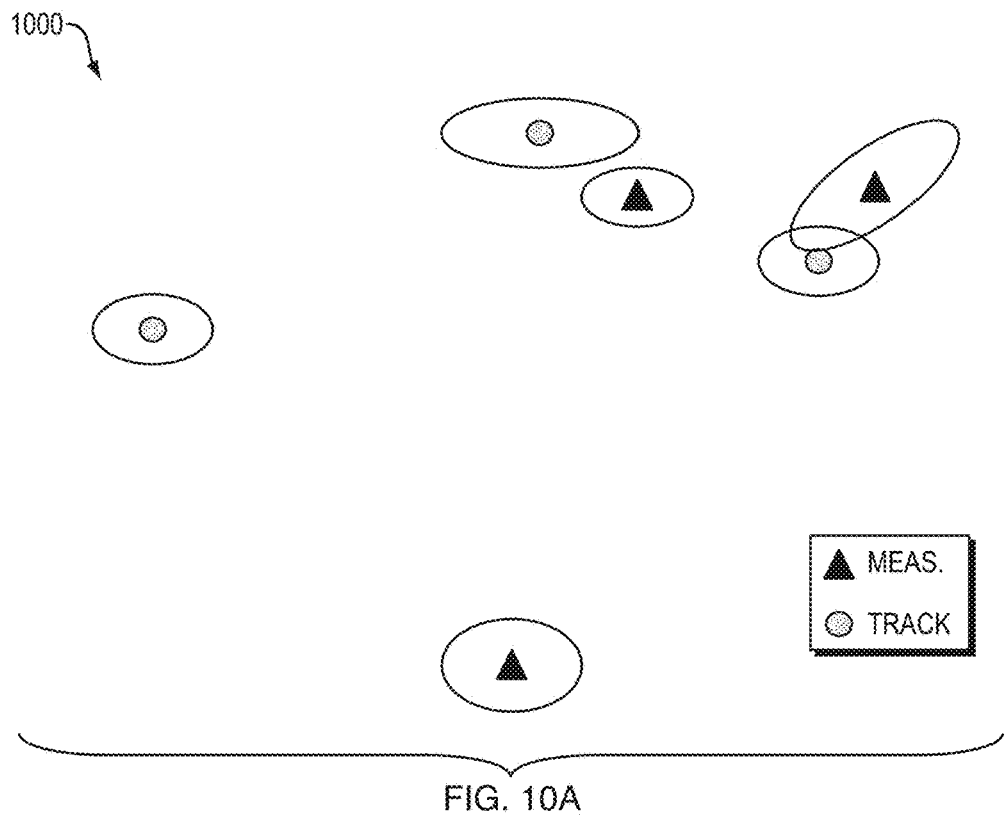
FIGS. 10A-D are diagrams illustrating elements of data association according to one embodiment.
Figure 10B:
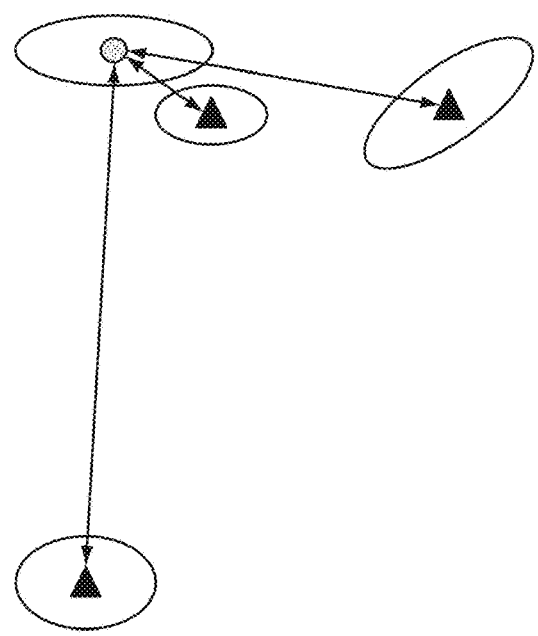
Figure 10C:
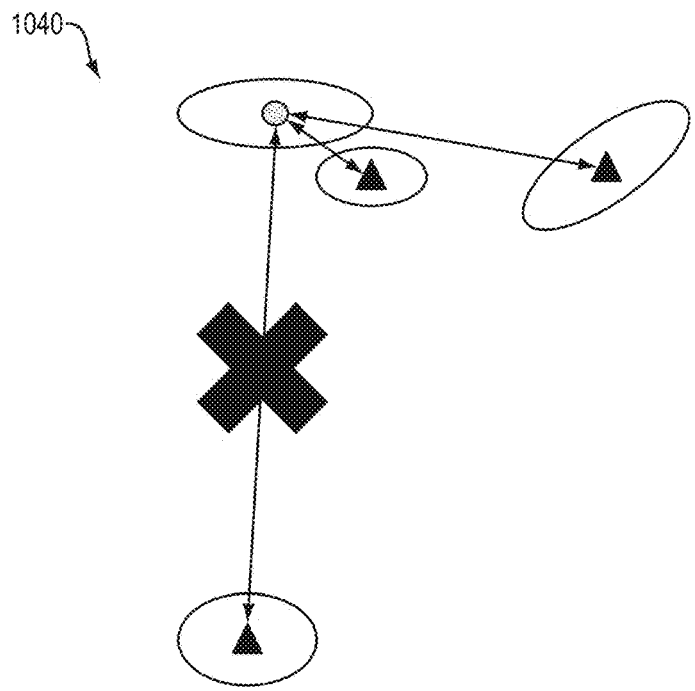
Figure 10D:
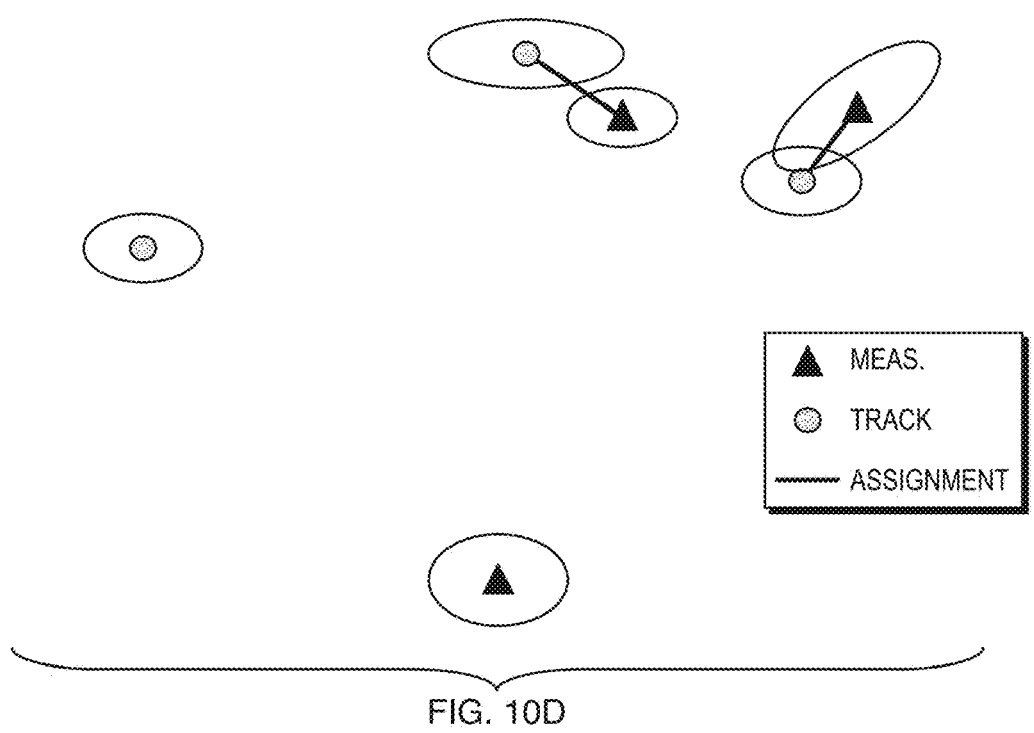

FIGS. 10A-D are diagrams 1000, 1020, 1040, and 1060 illustrating data association. The data association module associates a most recent set of measurements to existing tracks (FIG. 10A). First, the system calculates association scores for each track/measurement pair, as shown in FIG. 10B. In an embodiment, the scores can be distance from the objects to each other. Then, the system disallows or removes associations that are not plausible, as in FIG. 10C. Then, the data association module chooses the measurement-to-track assignment that minimizes the sum of the association scores. Then, based on the associated measurement, the tracks are updated. Updating the track considers the predicted track and the measured values to come to a new track.

Figure 11:
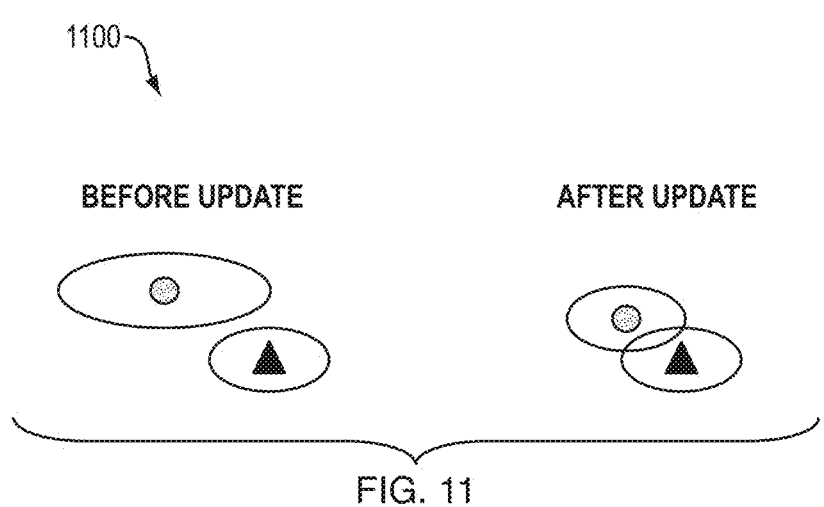
FIG. 11 is a diagram illustrating an example embodiment of updating tracks.

FIG. 11 is a diagram 1100 illustrating an example embodiment of updating tracks. Tracks can be updated based on how objects are associated. For example, if two objects are associated, the system can update the tracks to combine the tracks of the two objects, having the knowledge that the objects are associated and likely have the same or similar tracks.

While this invention has been particularly shown and described with references to example embodiments thereof, it will be understood by those skilled in the art that various changes in form and details may be made therein without departing from the scope of the invention encompassed by the appended claims.

Figure 12:
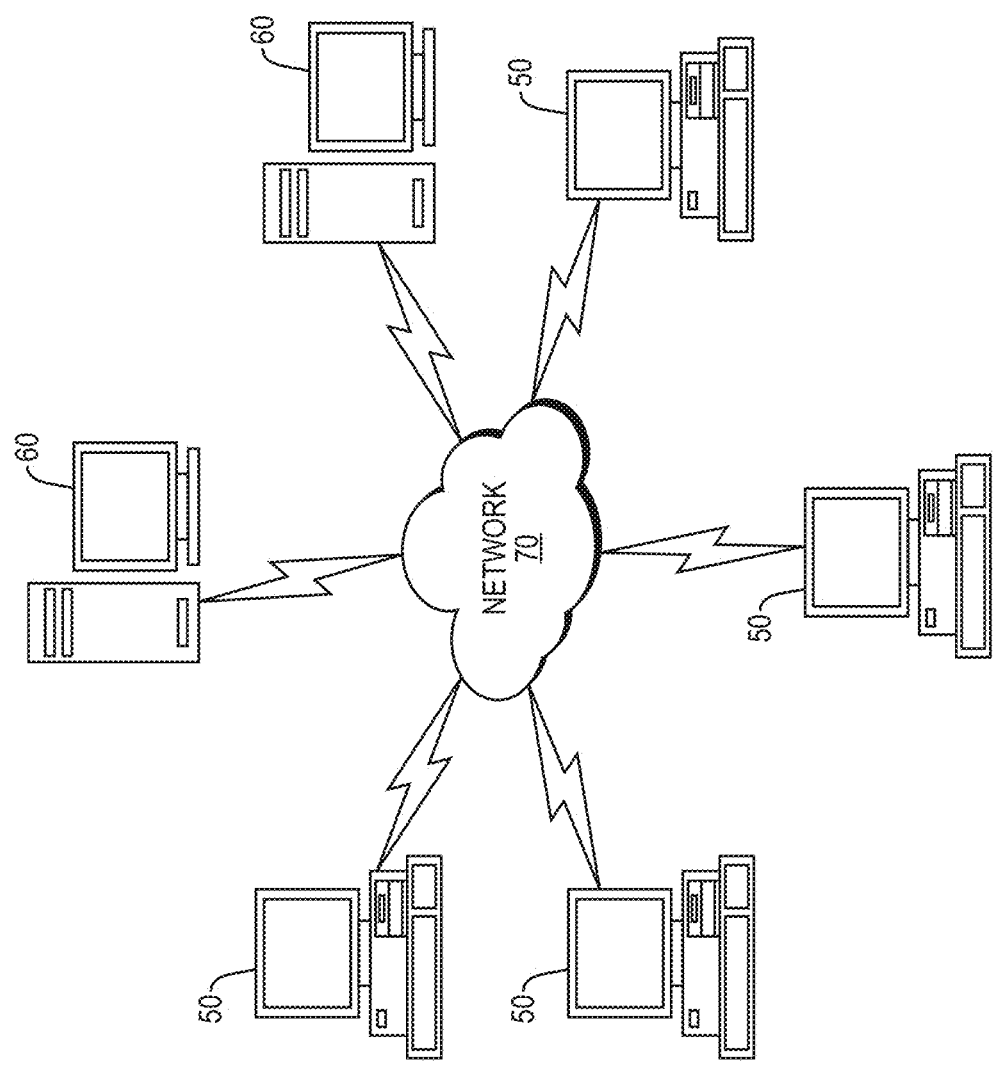
FIG. 12 illustrates a computer network or similar digital processing environment in which embodiments of the present invention may be implemented.

FIG. 12 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 13:
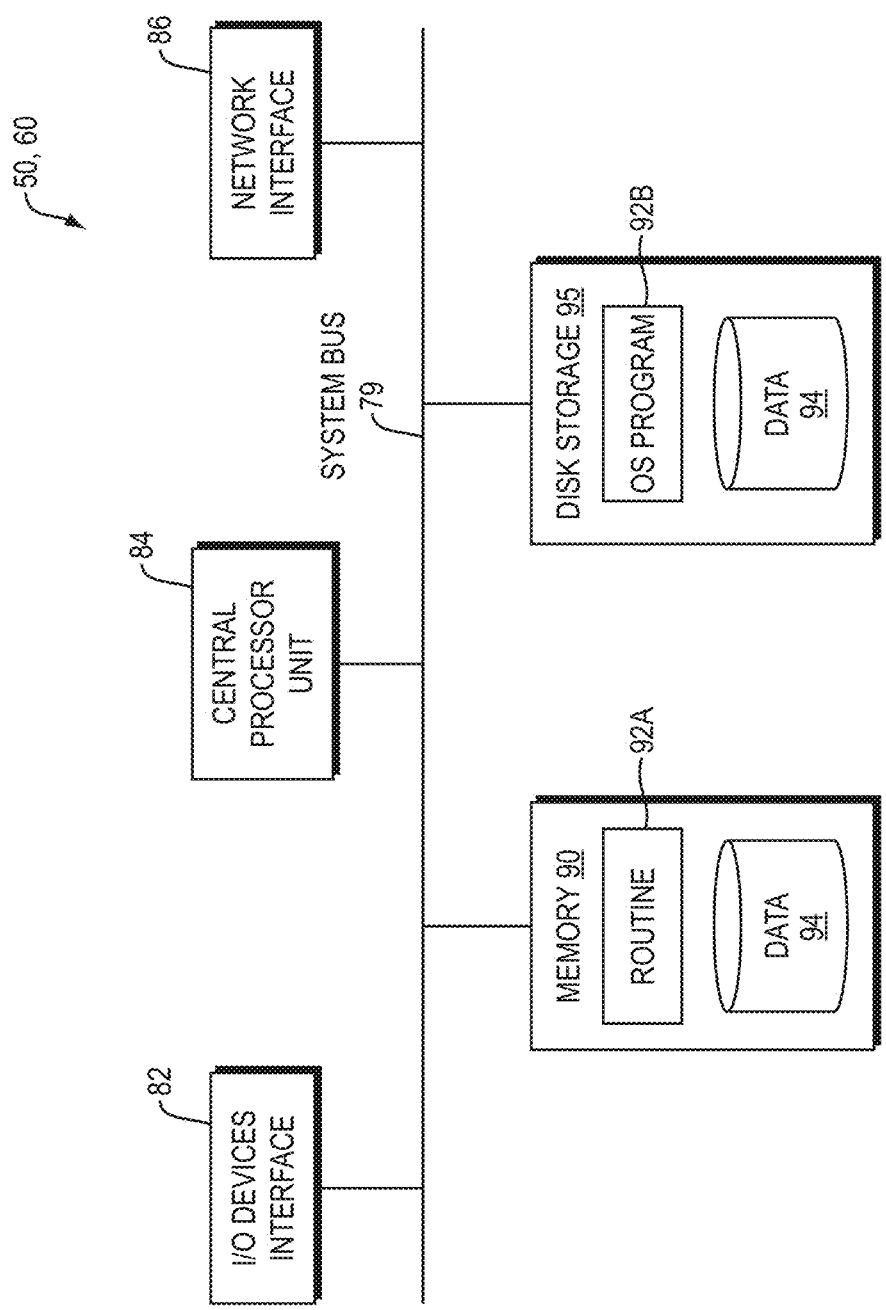
FIG. 13 is a diagram of an example internal structure of a computer (e.g., client processor/device or server computers) in the computer system of FIG. 11.

FIG. 13 is a diagram of an example internal structure of a computer (e.g., client processor/device 50 or server computers 60) in the computer system of FIG. 12. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 12). Memory 90 provides volatile storage for computer software instructions 92 and data 94 used to implement an embodiment of the present invention (e.g., sensor interface controller, perception controller, localization controller, automated driving controller, vehicle controller, system controller, human interaction controller, machine interaction controller, object fusion server, preprocessors, data association module, track updates module, track management module, track prediction module, and radar tracker detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

What is claimed is:

1. A method comprising:
    converting sensor data of a plurality of detected objects to a common coordinate frame, the sensor data of each detected object collected from a given sensor of a plurality of heterogeneous sensors at a current measurement time, each detected object including at least one of kinematic information, geometric information, and object classification information based on the converted sensor data, the plurality of heterogeneous sensors being mounted on a highly-automated vehicle;
    predicting position, velocity, orientation and bounding boxes of existing object tracks at the current measurement time, the predicting resulting in a given predicted object track associated with a given existing object track, the given predicted object track including at least one of kinematic information, geometric information, and object classification information;
    associating the detected objects to existing object tracks by determining a similarity of a given detected object and a given predicted object track, the information of the given detected object being a different type than the information of the given predicted object track;
    updating the kinematic, geometric and object classification information for existing object tracks by updating the given existing object track with the information of the given detected object determined to be similar to the predicted object track; and
    reporting a fused object list having a resulting set of updated object tracks.

2. The method of claim 1, further comprising initiating new object tracks for detected objects that are unassociated to existing object tracks.

3. The method of claim 1, further comprising deleting object tracks that are outside of a field-of-view of the one or more heterogeneous sensors view of the autonomous vehicle.

4. The method of claim 3, wherein deleting the object tracks further includes exempting object tracks from deletion if the object tracks are within a blind spot of the one or more heterogeneous sensors.

5. The method of claim 1, wherein associating detected objects to existing object tracks further determines a similarity of at least three of kinematic information, geometric information, and object classification information.

6. The method of claim 1, further comprising:
    associating detected feature tracks to existing object tracks by determining a similarity of at least two of kinematic information, geometric information, and object classification information.

7. The method of claim 1, wherein kinematic information includes position information, velocity, information, and orientation information, geometric information includes bounding boxes and object contours, and object classification information includes an object type.

8. A system comprising:
    a preprocessing module configured to convert sensor data of a plurality of detected objects to a common coordinate frame, the sensor data of each detected object collected from a given sensor of a plurality of heterogeneous sensors at a current measurement time, each detected object including at least one of kinematic information, geometric information, and object classification information based on the converted sensor data, the plurality of heterogeneous sensors being mounted on a highly-automated vehicle;
    a track prediction module configured to predict position, velocity, orientation and bounding boxes of existing object tracks at the current measurement time, the predicting resulting in a given predicted object track associated with a given existing object track, the given predicted object track including at least one of kinematic information, geometric information, and object classification information;
    a data association module configured to associate the detected objects to existing object tracks by determining a similarity of a given detected object and a given predicted object track, the information of the given detected object being a different type than the information of the given predicted object track;
    a track update module configured to update the kinematic, geometric and object classification information for existing object tracks by updating the given existing object track with the information of the given detected object determined to be similar to the predicted object track; and
    a reporting module configured to report a fused object list having a resulting set of updated object tracks.

9. The system of claim 8, further comprising a track management module configured to initiate new object tracks for detected objects that are unassociated to existing object tracks.

10. The system of claim 8, wherein the track update module is further configured to delete object tracks that are outside of a field-of-view of the one or more heterogeneous sensors view of the autonomous vehicle.

11. The system of claim 10, wherein the track update module is further configured to delete the object tracks by exempting object tracks from deletion if the object tracks are within a blind spot of the one or more heterogeneous sensors.

12. The system of claim 8, wherein the data association module is further configured to determine a similarity of at least three of kinematic information, geometric information, and object classification information.

13. The system of claim 8, wherein the data association module is further configured to associate detected feature tracks to existing object tracks by determining a similarity of at least two of kinematic information, geometric information, and object classification information.

14. The system of claim 8, wherein kinematic information includes position information, velocity, information, and orientation information, geometric information includes bounding boxes and object contours, and object classification information includes an object type.

15. A non-transitory computer-readable medium configured to store instructions for operating an autonomous vehicle, the instructions, when loaded and executed by a processor, causes the processor to:
    convert sensor data of a plurality of detected objects to a common coordinate frame, the sensor data of each detected object collected from a given sensor of a plurality of heterogeneous sensors at a current measurement time, each detected object including at least one of kinematic information, geometric information, and object classification information based on the converted sensor data, the plurality of heterogeneous sensors being mounted on a highly-automated vehicle;

predict position, velocity, orientation and bounding boxes of existing object tracks at the current measurement time, the predicting resulting in a given predicted object track associated with a given existing object track, the given predicted object track including at least one of kinematic information, geometric information, and object classification information;

associate the detected objects to existing object tracks by determining a similarity of a given detected object and a given predicted object track, the information of the given detected object being a different type than the information of the given predicted object track; and update the kinematic, geometric and object classification information for existing object tracks by updating the given existing object track with the information of the given detected object determined to be similar to the predicted object track;

report a fused object list having a resulting set of updated object tracks.

16. The non-transitory computer-readable medium of claim 15, wherein the instructions are further configured to cause the processor to initiate new object tracks for detected objects that are unassociated to existing object tracks.

17. The non-transitory computer-readable medium of claim 15, wherein the instructions are further configured to cause the processor to delete object tracks that are outside of a field-of-view of the one or more heterogeneous sensors view of the autonomous vehicle.

18. The non-transitory computer-readable medium of claim 17, wherein deleting the object tracks further includes exempting object tracks from deletion if the object tracks are within a blind spot of the one or more heterogeneous sensors.

19. The non-transitory computer-readable medium of claim 15, wherein associating detected objects to existing object tracks further determines a similarity of at least three of kinematic information, geometric information, and object classification information.

20. The non-transitory computer-readable medium of claim 15, wherein the instructions are further configured to cause the processor to associate detected feature tracks to existing object tracks by determining a similarity of at least two of kinematic information, geometric information, and object classification information.

* * * * *

UNITED STATES PATENT AND TRADEMARK OFFICE
CERTIFICATE OF CORRECTION

PATENT NO. : 10,599,150 B2  
APPLICATION NO. : 15/280291  
DATED : March 24, 2020  
INVENTOR(S) : Matthew Graham et al.

Page 1 of 1

It is certified that error appears in the above-identified patent and that said Letters Patent is hereby corrected as shown below:

On the Title Page

Item (73), delete "Kraper" and insert --Draper--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*